US005954319A

United States Patent [19]

Yonezawa

[11] Patent Number: 5,954,319

[45] Date of Patent: Sep. 21, 1999

[54] ROTARY CLAMPING APPARATUS

[75] Inventor: Keitaro Yonezawa, Kobe, Japan

[73] Assignee: Kabushiki Kaisha Kosmek, Hyogo, Japan

[21] Appl. No.: 08/896,425

[22] Filed: Jul. 18, 1997

[30] Foreign Application Priority Data

Jul. 19, 1996 [JP] Japan .............................. P8-190481

[51] Int. Cl.[6] ...................................................... B23Q 3/08

[52] U.S. Cl. ............................................................. 269/24

[58] Field of Search ................................ 269/24, 25, 27, 269/30, 31, 28, 228

[56] References Cited

U.S. PATENT DOCUMENTS 5,108,079 4/1992 Yonezawa et al. .

*Primary Examiner*—Timothy V. Eley
*Assistant Examiner*—Benjamin M. Halpern
*Attorney, Agent, or Firm*—McDermott, Will & Emery

[57] ABSTRACT

An upper end wall (3*a*) and a lower end wall (3*b*) of a housing (3) are adapted to support an upper sliding portion (11) and a lower sliding portion (12) of a clamp rod (5), respectively. A rotary portion (26) is provided on the clamp rod (5) below a piston (15) fixed to the clamp rod (5). A rotation actuating sleeve (27) is externally fitted onto the rotary portion (26) axially movably but unrotatably. The sleeve (27) is urged upward by a pushing spring (31) and prevented from moving farther than a predetermined distance by a stopper (32). An axial movement of the clamp rod (5) is converted to a rotary movement by a converting mechanism (34).

9 Claims, 7 Drawing Sheets

ROTARY CLAMPING APPARATUS

BACKGROUND OF THE INVENTION

1. Technical Field

This invention relates to a clamping apparatus of the type which linearly moves a clamp rod to a clamping position after having rotated it from a retreated position to an unclamping position.

Explanation of Earlier Technology

Conventionally, there has been existing a clamping apparatus disclosed in Japanese Utility Model Publication No. 60-18267 as an example of the rotary clamping apparatus of this type.

More specifically, it is a clamping apparatus which comprises a housing provided with an upper end wall slidably supporting a clamp rod, a rotation actuating shaft being inserted into a lower portion of the clamp rod, an engaging pin fixed onto the clamp rod being engaged with a guide groove of the shaft. The clamp rod is rotated along an inclined cam portion of the guide groove and thereafter moved to a clamping position along a linear portion of the guide groove.

The above-mentioned conventional technique requires a predetermined engaging gap between the engaging pin and the guide groove and therefore cannot guide the clamp rod straightly. Accordingly, it encounters a difficulty in linearly driving the clamp rod with accuracy at the time of clamping.

SUMMARY OF THE INVENTION

An object of the present invention is to improve the linearity of the clamp rod at the time of clamping.

In order to accomplish the above object, the invention of claim 1 has constructed a rotary clamping apparatus as follows, for example, as shown in FIGS. 1 to 9.

A clamp rod 5 is inserted into a guide bore 4 within a housing 3. A first end wall 3*a* of the housing 3 is adapted to slidably support a first sliding portion 11 of the clamp rod 5 and a second end wall 3*b* of the housing 3 is adapted to slidably support a second sliding portion 12 of the clamp rod 5. A piston 15 is provided on the clamp rod 5 between the first sliding portion 11 and the second sliding portion 12 and axially movably inserted into the guide bore 4. A rotary portion 26 is provided on the clamp rod 5 between the piston 15 and the second sliding portion 12. A rotation actuating sleeve 27 is inserted axially movably into an annular space between the rotary portion 26 and the guide bore 4 with its rotation stopped. The sleeve 27 is urged toward the first end wall 3*a* by a pushing spring 31. A stopper means 32 is provided for preventing the sleeve 27 from moving farther than a predetermined distance. A converting mechanism 34 for converting an axial movement of the clamp rod 5 to a rotary movement is provided extending over the rotary portion 26 and the sleeve 27.

The invention of claim 1 presents the following advantage.

A first end wall of a housing supports a first sliding portion of a clamp rod and a second end wall of the housing supports a second sliding portion of the clamp rod. A rotation actuating sleeve is externally fitted onto a rotary portion provided between these two sliding portions. Therefore, the clamp rod can be guided precisely at two positions, namely the first and the second sliding portions, independently of an engaging gap to be required for the rotary portion and the sleeve and besides the distance between the two sliding portions is large. This can increase the effective guide length of the clamp rod and improve the linearity at the time of clamping operation to thereby perform the clamping accurately.

BRIEF DESCRIPTION OF THE DRAWINGS

FIGS. 1 to 9 show one embodiment of a clamping apparatus according to the present invention;

FIG. 1 is a vertical sectional view of the clamping apparatus retreated;

FIG. 2 is a vertical sectional view of the clamping apparatus unclamped;

FIG. 3 is a vertical sectional view of the clamping apparatus clamped;

FIG. 4 is a plan view of FIG. 1;

FIG. 5 is an elevational view of a rotary portion provided on a clamp rod of the clamping apparatus;

FIG. 6(A) is a plan view of a sleeve to be externally fitted onto the rotary portion;

FIG. 6(B) is a sectional view taken along a line 6B—6B in FIG. 6(A) when seen in a direction indicated by arrows;

FIG. 7 is a developed view of the sleeve when cutting it along a line VII in FIG. 6(A) and seeing the cut surface from the inside;

FIG. 8 is a developed view of the rotary portion and corresponds to FIG. 7;

DESCRIPTION OF THE PREFERRED EMBODIMENTS

Hereafter, one embodiment of the present invention will be explained with reference to FIGS. 1 through 9.

Figure 1:
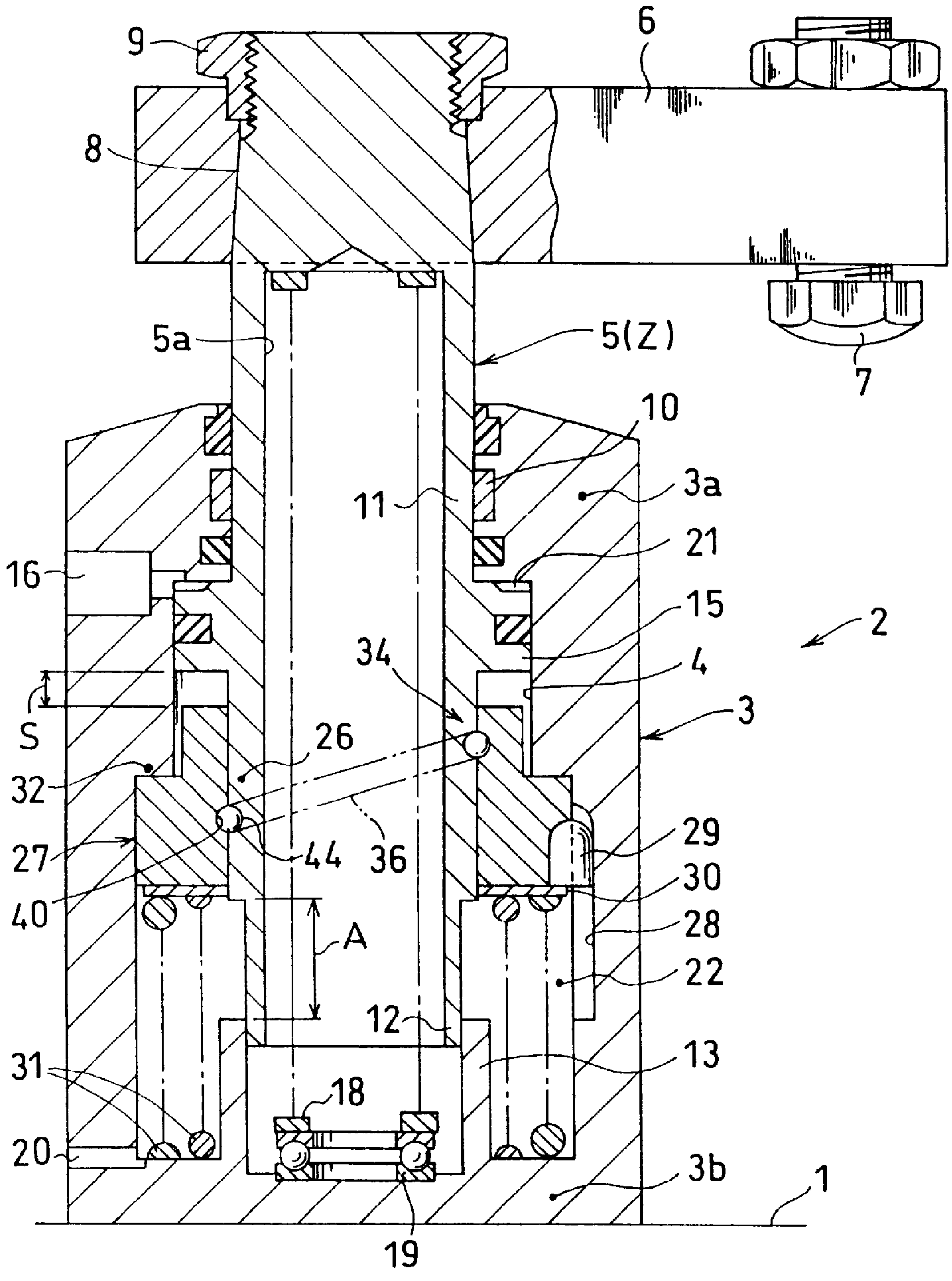
Figure 4:
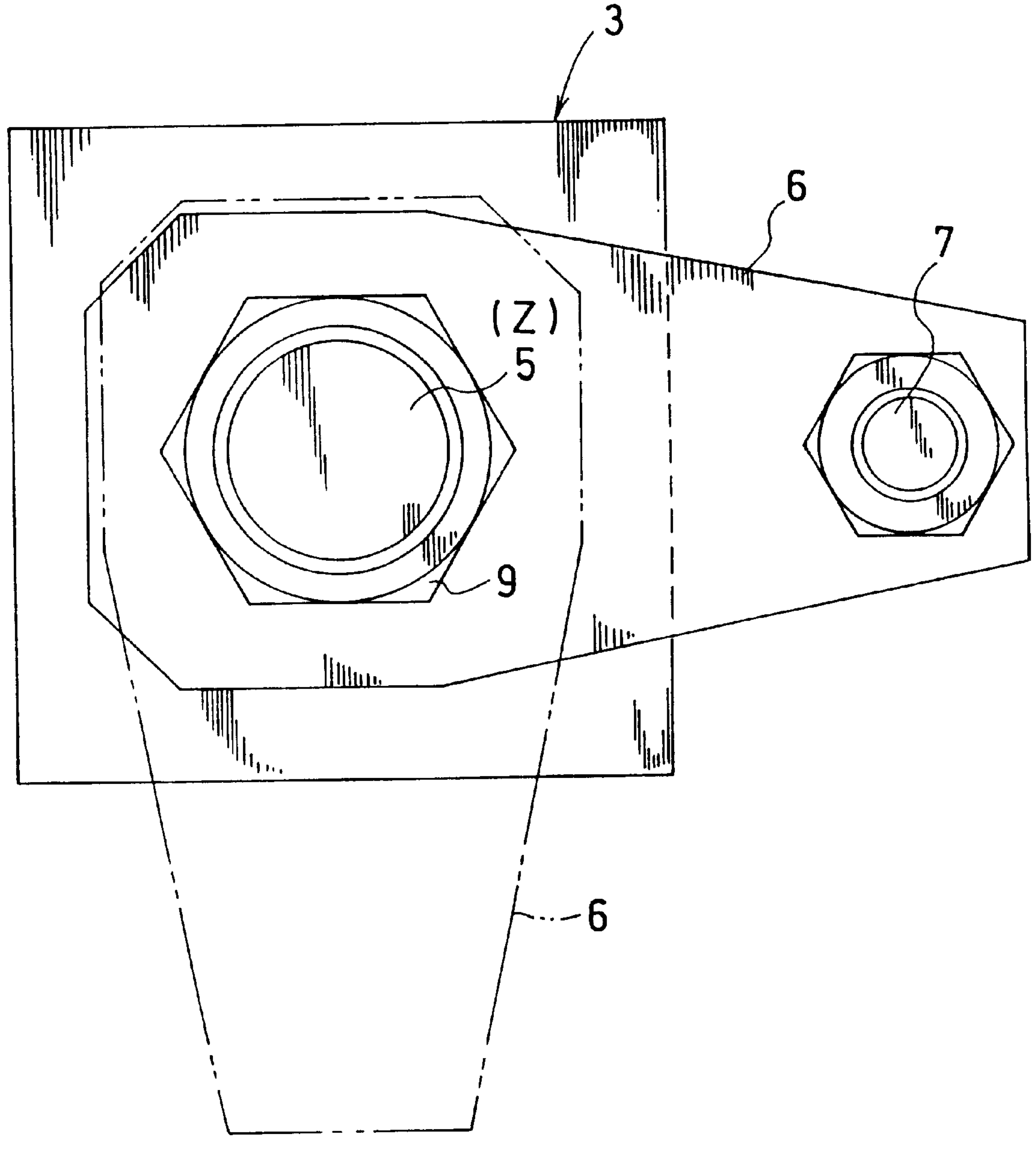

First, a clamping apparatus is outlined with reference to FIGS. 1 and 4. FIG. 1 is a vertical sectional view showing the clamping apparatus retreated. FIG. 4 is a plan view of FIG. 1.

A plurality of bolts (not shown) fix a housing 3 of a clamping apparatus 2 to a table 1 for a machine tool. Inserted into a guide bore 4 within the housing 3 is a cylindrical clamp rod 5 which has an arm 6 radially projecting from its upper end portion (a first end portion). The arm 6 is provided with a push bolt (pushing member) 7 at its leading end. The arm 6 is engaged with a tapered surface 8 of the clamp rod 5 to be fixed at a predetermined rotation position through a nut 9.

A guiding bush 10 is attached to an upper end wall (a first end wall) 3*a* of the housing 3. The bush 10 slidably supports an upper sliding portion (a first sliding portion) 11 of the clamp rod 5. Further, the housing 3 is provided at its lower end wall (a second end wall) 3*b* with a guide cylinder 13. The guide cylinder 13 slidably supports a lower sliding portion (a second sliding portion) 12 of the clamp rod 5.

A piston 15 is provided on the clamp rod 5 between the upper sliding portion 11 and the lower sliding portion 12. The piston 15 is axially movably and hermetically inserted into the guide bore 4. Although the piston 15 is integrally formed with the clamp rod 5, it may be separately formed therefrom.

A first chamber 21 for clamping is formed between the upper end wall 3*a* and the piston 15. Pressurized oil (pressurized fluid) is adjusted to be able to be supplied to and discharged from the first chamber 21 through a supply and discharge port 16. Additionally, a second chamber 22 for unclamping is formed between the lower end wall 3*b* and the piston 15. An unclamping spring 18 attached within the second chamber 22 urges the clamp rod 5 upwards. More specifically, the unclamping spring 18 is inserted into a hollow portion 5*a* of the clamp rod 5 to bring its upper end into contact with an upper portion of the clamp rod 5 and have its lower end received by a thrust bearing 19. The second chamber 22 is communicated with the atmosphere through a breather passage 20.

A rotary portion 26 is provided on the clamp rod 5 between the piston 15 and the lower sliding portion 12. Further, a rotation actuating sleeve 27 is axially movably inserted into an annular space between the rotary portion 26 and the guide bore 4 with its rotation stopped. More concretely, a detent pin 29 is interposed between a vertical groove 28 formed in the guide bore 4 and the sleeve 27. A support plate 30 prevents the detent pin 29 from dropping. The vertical groove 28 and the pin 29 compose a means for linearly guiding the sleeve 27 in a vertical direction.

The sleeve 27 is urged upward by a pushing spring 31 composed of two coil springs and prevented from moving upwards farther than a predetermined distance by a stopper 32 constructed from a stepped portion of the guide bore 4. The value of the urging force of the pushing spring 31 is set to substantially the same as that of the urging force of the unclamping spring 18.

A converting mechanism 34 is provided extending over the rotary portion 26 and the sleeve 27. The converting mechanism 34 converts an axial movement of the clamp rod 5 to a rotary movement, although its concrete structure is explained later.

Figure 2:
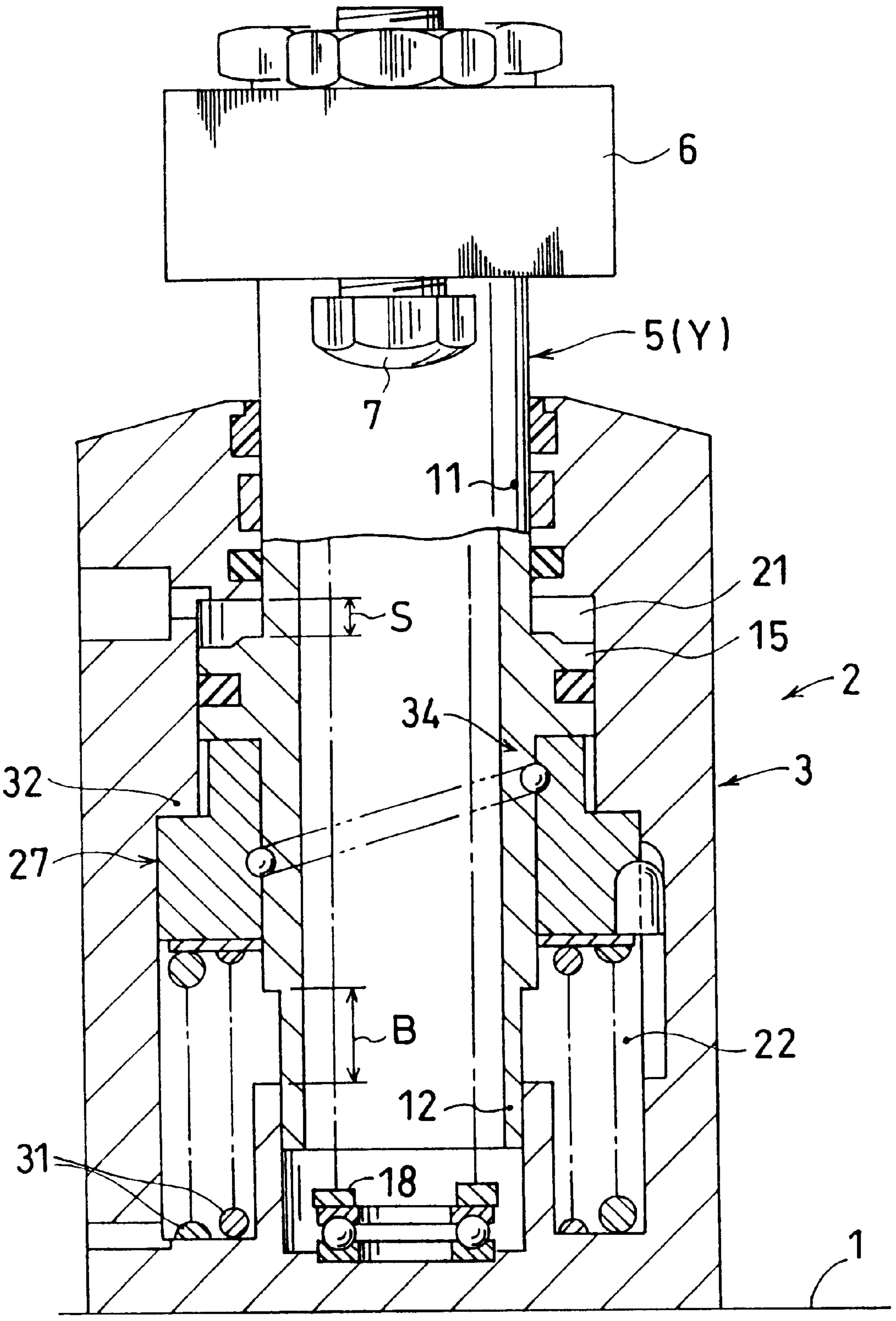
Figure 3:
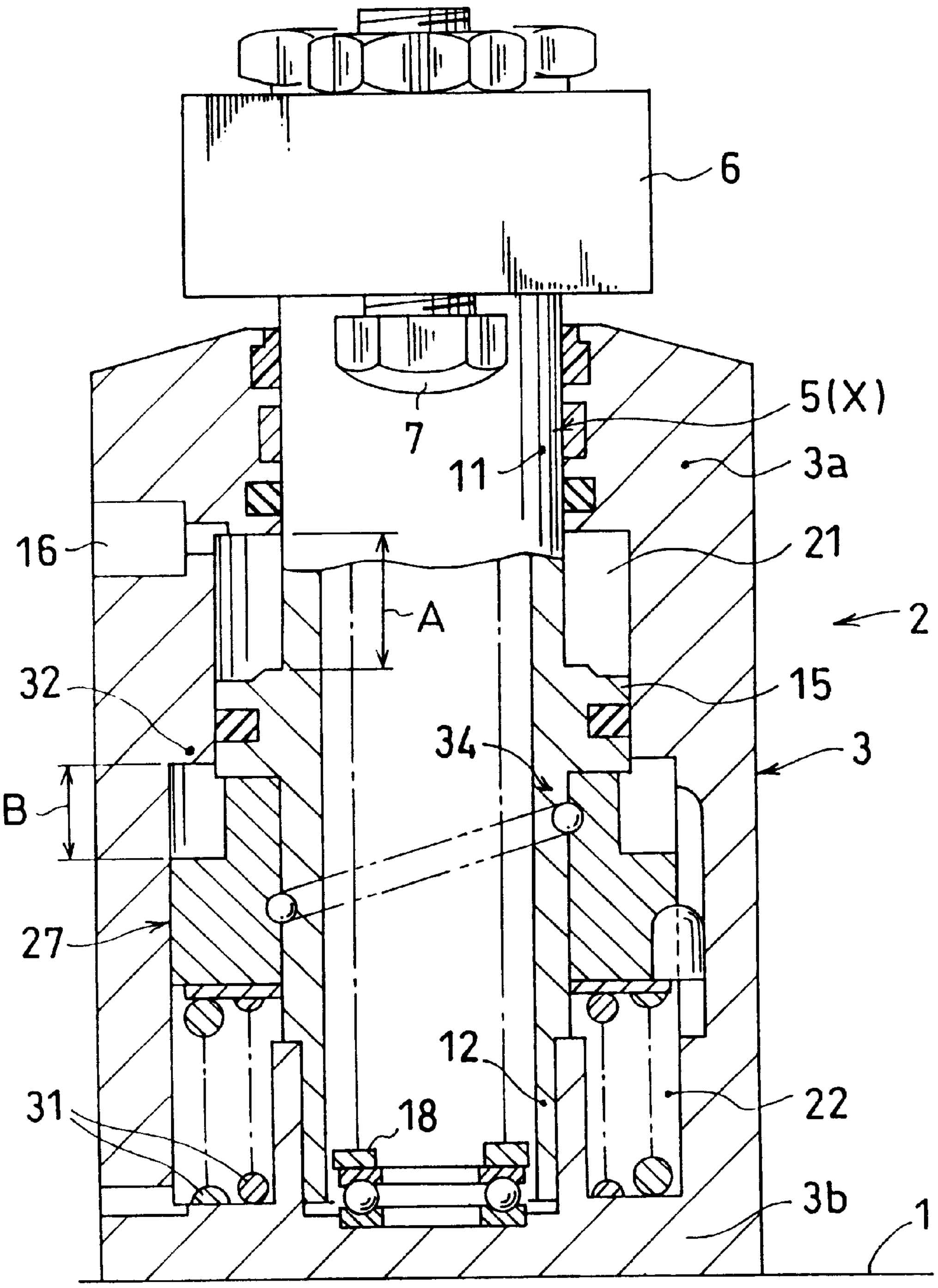

Operation of the clamping apparatus is explained with reference to FIGS. 1, 2 and 3. In FIGS. 1 to 3, characters (A), (B) and (S) indicate a whole stroke, a clamping stroke and a rotation stroke, respectively.

On switching over from a retreated condition of FIG. 1 to a clamping condition of FIG. 3 via an unclamping condition of FIG. 2, pressurized oil is first supplied to the first chamber 21 for clamping in the retreated condition of FIG. 1.

Then the piston 15 goes down and the clamp rod 5 lowers while being rotated by the converting mechanism 34. And as shown in FIG. 2, when the piston 15 goes down by the rotation stroke (S) to contact with the sleeve 27, the clamp rod 5 is switched over to an unclamping position (Y). Next, the piston 15 lowers the sleeve 27 against the pushing spring 31 by oil pressure force of the first chamber 21 and as a result the clamp rod 5 is switched over to a clamping position (X) of FIG. 3.

On switching over from the clamping condition of FIG. 3 to the retreated condition of FIG. 1 via the unclamping condition of FIG. 2, the pressurized oil in the first chamber 21 is discharged in the clamping condition of FIG. 3.

Then the clamp rod 5 and the sleeve 27 go upwards by the urging force of the unclamping spring 18 and that of the pushing spring 31. And as shown in FIG. 2, the sleeve 27 goes upwards by the clamping stroke (B) to be received by the stopper 32, thereby switching over the clamp rod 5 to the unclamping position (Y).

Subsequently, the clamp rod 5 goes upwards by the rotation stroke (S) while being rotated by the urging force of the unclamping spring 18 and is switched over to a retreated position (Z) of FIG. 1.

Figure 5:
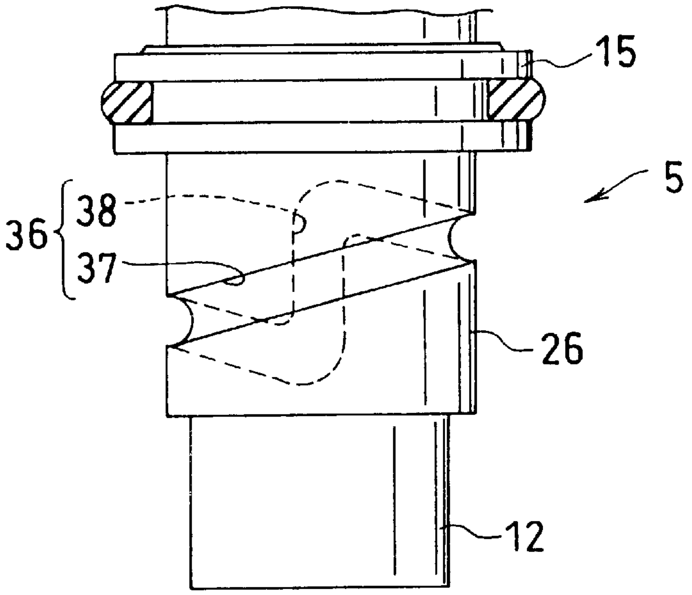
Figure 6:
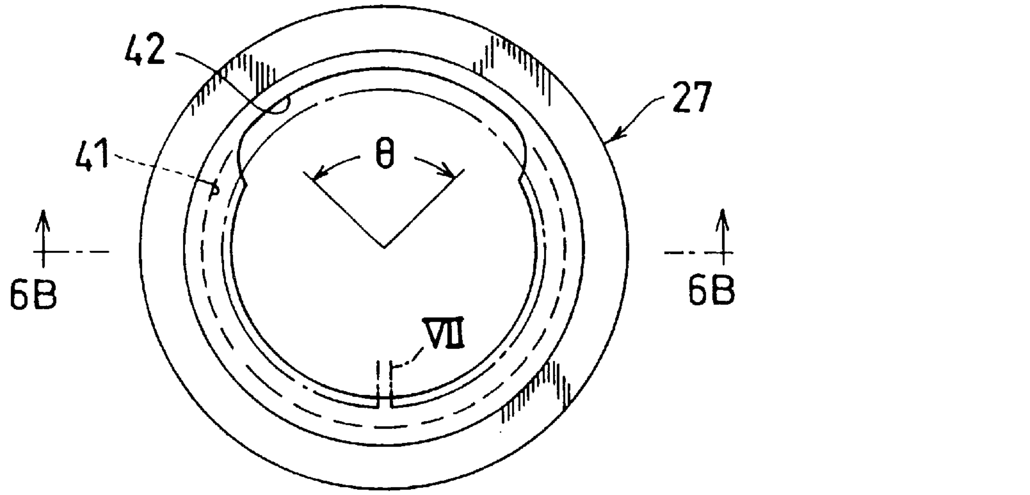
Figure 6:
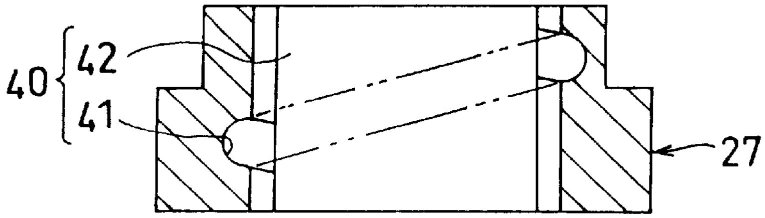
Figure 7:
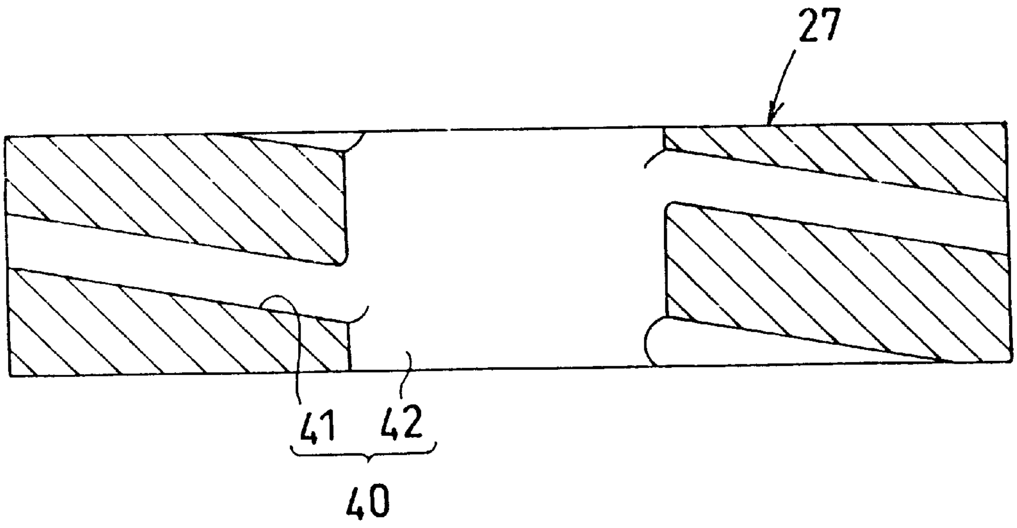
Figure 8:
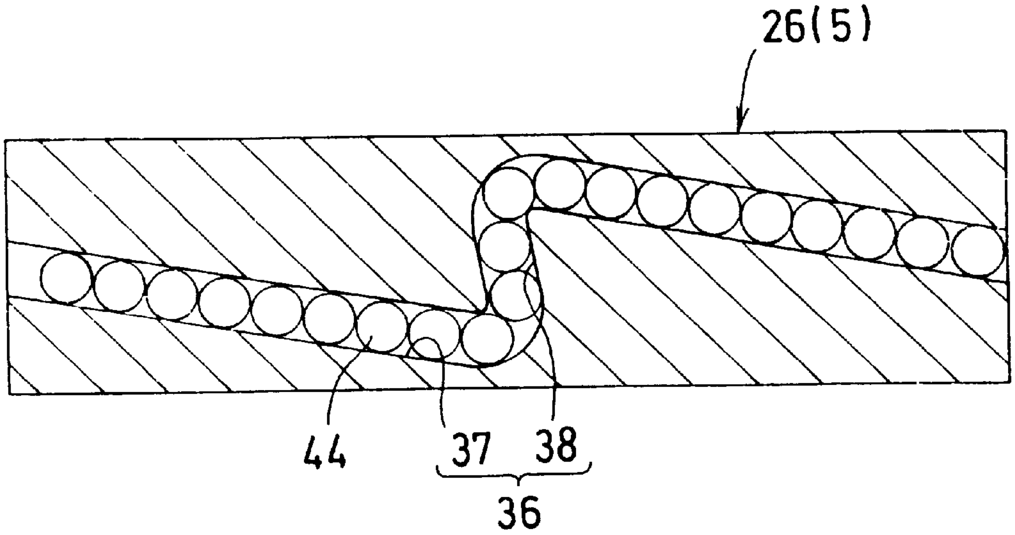

Next, a concrete structure of the converting mechanism 34 is explained with reference to FIGS. 5 through 8. FIG. 5 is an elevational view of the rotary portion 26 provided on the clamp rod 5. FIG. 6(A) is a plan view of the sleeve 27 and FIG. 6(B) is a sectional view taken along a line 6B—6B in FIG. 6(A) when seen in a direction indicated by arrows. FIG. 7 is a developed view of the sleeve 27 when cutting it along a line VII in FIG. 6(A) and seeing the cut surface from the inside. FIG. 8 is a developed view of the rotary portion 26 and corresponds to FIG. 7.

As shown in FIGS. 5 and 8, the rotary portion 26 is provided with a rotary groove 36 concaved in the shape of an arc. The rotary groove 36 is composed of a first groove portion 37 formed spirally only by about one pitch in an outer peripheral surface of the rotary portion 26 and a second groove portion 38 communicating an initial end of the first groove portion 37 with a terminal end thereof substantially in an axial direction.

As shown in FIGS. 6(A) and 6(B), and FIG. 7, the sleeve 27 is provided with an actuating groove 40. The actuating groove 40 is composed of a rotation actuating groove portion 41 formed spirally in correspondence with the first groove portion 37 and a relief groove portion 42 formed so as to peripherally extend in correspondence with the second groove portion 38. As shown in FIG. 6(A), a peripheral length of the relief groove portion 42 is adjusted to correspond to a rotation angle (θ) (about 90 degrees in this embodiment) of the clamp rod 5.

As shown in FIG. 8 (and FIG. 1), a number of steel rolling balls 44 are charged into a space between the rotary groove 36 and the actuating groove 40.

Figure 9A:
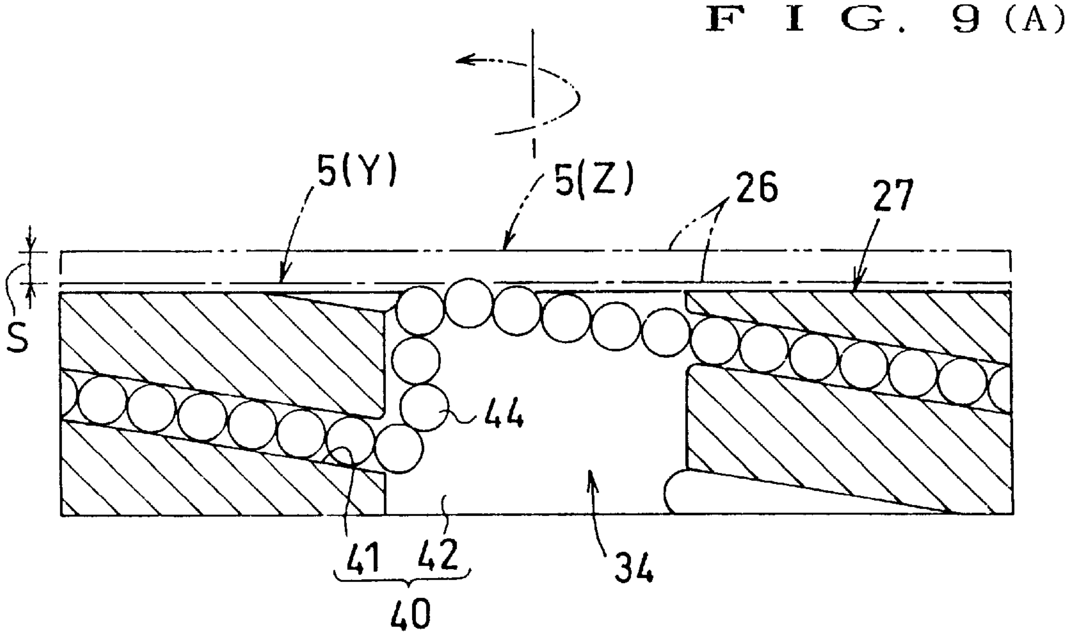
FIG. 9(A) is a view explaining the operation of the sleeve and the rotary portion and showing the clamp rod switched over to a retreated position.
Figure 9B:
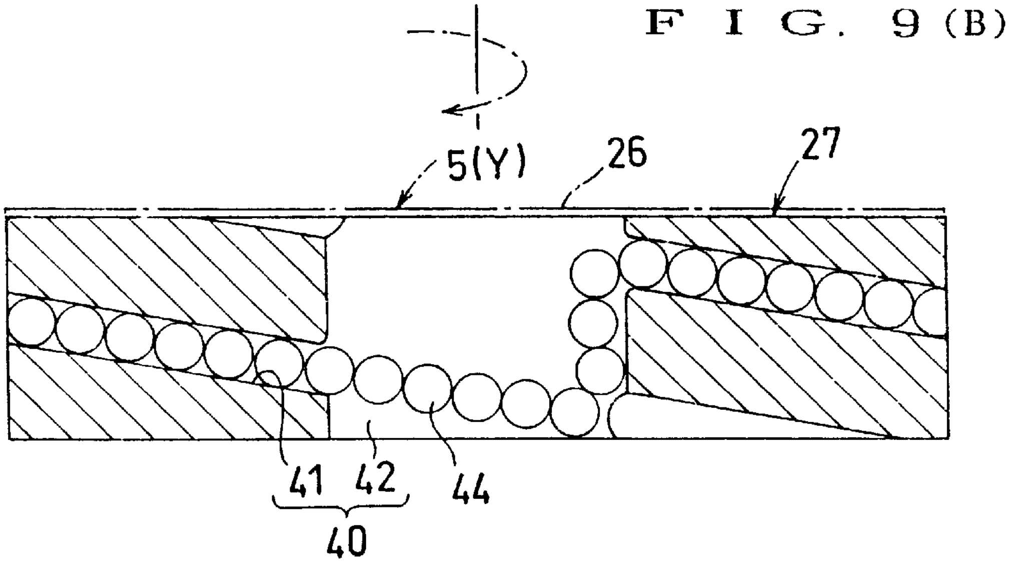
FIG. 9(B) shows the clamp rod switched over to an unclamping position.

Operation of the converting mechanism 34 of the above structure is explained by FIGS. 9(A) and 9(B) with reference to FIG. 8.

In a retreated condition of FIG. 9(A), the clamp rod 5 is raised to the retreated position (Z) shown by an alternate dash-and-two dots chain line relatively to the sleeve 27 and the rotary portion 26 of the clamp rod 5 is rotated in a counter-clockwise direction when seen in a plan view. When the clamp rod 5 is lowered relatively to the sleeve 27, as shown in FIG. 9(B) the rotary portion 26 is lowered along the groove portion 41 while being rotated in a clockwise direction when seen in the plan view and at the same time the balls 44 are circulated in the clockwise direction when seen in the plan view. Thus the clamp rod 5 is switched over to the unclamping position (Y) shown by an alternate dash-and-dot chain line.

The clamp rod 5 is switched over from the unclamping position (Y) of FIG. 9(B) to the retreated position (Z) of FIG. 9(A) according to the procedures substantially reverse to the above-mentioned ones.

The foregoing embodiment has the following advantages.

Since the clamp rod 5 is supported at vertical two positions, namely the upper end wall 3*a* and the lower end wall 3*b* of the housing 3, an effective guide length is large. This enhances the linearity at the time of clamping operation to thereby perform the clamping accurately.

In addition, when the push bolt 7 clamps an object to be fixed (not shown) such as a workpiece or the like, a reaction force resulting from the push bolt 7 acts on the clamp rod 5 as an eccentric load via an arm 6. However, having a large effective guide length as mentioned above, the clamp rod 5 can avoid operation failure caused by seizing or the like to thereby move smoothly.

The clamp rod 5 is cylindrically formed to provide a hollow portion 5*a* and the unclamping spring 18 is inserted into the hollow portion 5*a*. Therefore, the hollow portion 5a can be utilized as a space for attaching the unclamping spring 18 to result in the possibility of making the housing 3 compact. This makes it possible to downsize the clamping apparatus.

An inner space of the second chamber 22 for unclamping is used as a space for attaching the sleeve 27 and the pushing spring 31, so that the housing 3 can be made more compact. This makes it possible to further downsize the clamping apparatus.

The clamp rod 5 can perform the unclamping operation smoothly and assuredly because both the urging force of the unclamping spring 18 and that of the pushing spring 31 act thereon when it is switched over from the clamping position (X) of FIG. 3 to the unclamping position (Y) of FIG. 2.

Further, since any excessive force does not act on the balls 44, only a single set of the rotary groove 36 and the actuating groove 40 is sufficient and besides the number of the required balls is reduced to result in the possibility of making the converting mechanism 34 compact and simple. More concretely, while only the urging force of the pushing spring 31 acts on the balls 44 between the unclamping condition of FIG. 2 and the clamping condition of FIG. 3, merely the urging force of the unclamping spring 18 acts on the balls 44 between the unclamping condition of FIG. 2 and the retreated condition of FIG. 1. In either case, no excessive force acts on the balls 44.

Having a structure of rolling-ball type, the converting mechanism 34 suffers from only a small frictional resistance at the time of rotation. In consequence, it is possible to perform a smooth rotation and at the same time shorten a lead of the rotary groove 36. As a result, the rotation stroke (S) can be reduced, which in turn decrease a vertical space for installing the clamping apparatus 2.

The above embodiment can be modified as follows.

The fluid to be supplied to the first chamber 21 may be other kinds of liquid or a gas such as air instead of the pressurized oil.

The rotation angle (θ) of the clamp rod 5 may be set to any desired angle such as 60 degrees, 45 degrees, 30 degrees or the like instead of the above-mentioned about 90 degrees.

The converting mechanism 34 may have another structure utilizing a cam groove or the like, instead of the illustrated structure of the rolling-ball type.

The means for linearly guiding the sleeve 27 may be formed from a guide bore rectangular in cross section and a sleeve of the same shape fitted to one another, instead of combining the vertical groove 28 of the guide bore 4 with the pin 29.

The clamping apparatus 2 may be of double-acting type instead of the illustrated single-acting type. More specifically, it may be constructed so that the pressurized fluid can be supplied to and discharged from the second chamber 22 as well, and the unclamping spring 18 is omitted.

What is claimed is:

1. A rotary clamping apparatus comprising:

a housing (3) having a first end wall **(3*a*) and a second end wall (3*b*), and a guide bore (4)**;

a clamp rod (5) having a longitudinal axis, inserted into the guide bore (4), the clamp rod (5) being provided with a first sliding portion (11) slidably supported by the first end wall **(3*a*) and a second sliding portion (12) slidably supported by the second end wall (3*b*)**;

a piston (15) provided on the clamp rod (5) between the first sliding portion (11) and the second sliding portion (12), the piston (15) being axially movably inserted into the guide bore (4);

a rotary portion (26) provided on the clamp rod (5) between the piston (15) and the second sliding portion (12);

a rotation actuating sleeve (27) inserted into an annular space between the rotary portion (26) and the guide bore (4);

a linearly guiding means (28,29) enabling the sleeve (27) to axially move and preventing it from rotating around said longitudinal axis;

a pushing spring (31) urging the sleeve (27) toward the first end wall **(3*a*)**;

a stopper means (32) preventing the sleeve (27) from being moved by the pushing spring (31) farther than a predetermined distance; and a converting mechanism (34) provided extending over the rotary portion (26) and the sleeve (27) so as to convert an axial movement of the clamp rod (5) to a rotary movement.

2. A clamping apparatus as set forth in claim 1, wherein the clamp rod (5) is cylindrically formed to provide a hollow portion **(5*a*), a first chamber (21) for clamping being formed between the first end wall (3*a*) of the housing (3) and the piston (15), a pressurized fluid being adjusted to be supplied to and discharged from the first chamber (21), a second chamber (22) for unclamping being formed between the second end wall (3*b*) of the housing (3) and the piston (15), the sleeve (27), the pushing spring (31) and an unclamping spring (18) being arranged in the second chamber (22), the unclamping spring (18) being inserted into the hollow portion (5*a*) of the clamp rod (5), the clamp rod (5) being urged toward the first end wall (3*a*) by the unclamping spring (18)**.

3. A clamping apparatus as set forth in claim 1, wherein a guide cylinder (13) is fixed to the second end wall **(3*b*), the second sliding portion (12) of the clamp rod (5) being supported by the guide cylinder (13)**.

4. A clamping apparatus as set forth in claim 1, wherein the clamp rod (5) has a first end portion provided with a forwardly narrowing tapered surface (8), an arm (6) being fixed to the tapered surface (8) by taper fitting.

5. A clamping apparatus as set forth in claim 1, wherein the piston (15) is integrally formed with the clamp rod (5).

6. A clamping apparatus as set forth in claim 2, wherein a guide cylinder (13) is fixed to the second end wall **(3*b*), the second sliding portion (12) of the clamp rod (5) being supported by the guide cylinder (13)**.

7. A clamping apparatus as set forth in claim 2, wherein the clamp rod (5) has a first end portion provided with a forwardly narrowing tapered surface (8), an arm (6) being fixed to the tapered surface (8) by taper fitting.

8. A clamping apparatus as set forth in claim 3, wherein the clamp rod (5) has a first end portion provided with a forwardly narrowing tapered surface (8), an arm (6) being fixed to the tapered surface (8) by taper fitting.

9. A clamping apparatus as set forth in claim 2, wherein the piston (15) is integrally formed with the clamp rod (5).

* * * * *